US012627130B2

(12) United States Patent
Burke et al.

(10) Patent No.: US 12,627,130 B2
(45) Date of Patent: May 12, 2026

(54) GRADE LEVEL UTILITIES ENCLOSURE HAVING TAPERED WALLS AND BRACKET

(71) Applicant: CHANNELL COMMERCIAL CORPORATION, Temecula, CA (US)

(72) Inventors: Edward J. Burke, Temecula, CA (US); Robert H. Gwillim, Murrieta, CA (US)

(73) Assignee: Channell Commercial Corporation, Temecula, CA (US)

( * ) Notice: Subject to any disclaimer, the term of this patent is extended or adjusted under 35 U.S.C. 154(b) by 234 days.

(21) Appl. No.: 18/617,238

(22) Filed: Mar. 26, 2024

(65) Prior Publication Data

US 2025/0309628 A1     Oct. 2, 2025

(51) Int. Cl.
*H02G 9/00* (2006.01)
*G02B 6/50* (2006.01)
*H02G 9/10* (2006.01)

(52) U.S. Cl.
CPC .............. *H02G 9/10* (2013.01); *G02B 6/501* (2023.05)

(58) Field of Classification Search
CPC .................................. H02G 9/10; G02B 6/501
See application file for complete search history.

(56) References Cited

U.S. PATENT DOCUMENTS

| 4,163,503 | A | * | 8/1979 | McKinnon | ............... | H02G 9/10 |
| | | | | | | 220/254.3 |
| 9,287,693 | B2 | | 3/2016 | Burke | | |
| 2014/0017018 | A1 | * | 1/2014 | Blais | ..................... | E01H 1/0836 |
| | | | | | | 406/146 |
| 2016/0053521 | A1 | * | 2/2016 | Unger | ...................... | H02G 3/14 |
| | | | | | | 292/164 |

* cited by examiner

*Primary Examiner* — Pete T Lee
(74) *Attorney, Agent, or Firm* — Womble Bond Dickinson (US) LLP

(57) ABSTRACT

A grade level utility enclosure for underground utilities connections having a tapered vertical wall structure extending continuously around an open interior region within the tapered vertical wall structure, a rim extending around a top opening to the interior of the enclosure and a bottom edge on which the enclosure is supported, a removable lid adapted for mounting on the rim over the top opening, the tapered vertical wall structure including a first wall panel section and a second wall panel section, the first wall panel section panel is smaller in circumference than the second wall panel section, and an upright rigid support bar adapted for use as a cable rack having a first end positioned in a first pocket located in the rim and a second end positioned in a second pocket located in a bracket positioned on an inside surface of the second wall panel section.

20 Claims, 5 Drawing Sheets

GRADE LEVEL UTILITIES ENCLOSURE HAVING TAPERED WALLS AND BRACKET

FIELD OF THE INVENTION

This invention relates to enclosures for underground utility lines, and more particularly, to an underground utility enclosure having tapered walls and a bracket for attaching vertical racks to the walls.

BACKGROUND

Underground utility equipment enclosures include the so-called grade level vaults, splice boxes, pull boxes, and the like, for various applications requiring access to an underground service. These may include electrical, gas, water, telephone, fiber optics and cable TV installations, for example.

Grade level enclosures are commonly subjected to different kinds of structural loads during use. Generally speaking, prior art enclosures and their cover plates are made from reinforced concrete, fiberglass, or polymer composite materials for added load strength, to withstand the compression forces during use.

Grade level enclosures, particularly those used for telecommunications equipment, are adapted to facilitate use with different types of internal equipment. They may include splice cases, fiber optic cables, electrical wires, and the like, supported in the enclosure by metal cable racks fastened to upper portions of the enclosure's inside walls.

Industry standards have been developed for conformance tests and requirements for the structural integrity of such grade level enclosures. One standard commonly used for underground enclosures is known as ANSI/SCTE 77-2010. This set of standards for underground enclosure integrity has Tier designations that relate to various load ratings to ensure proper performance for different types of underground enclosures. The objective of these standards is to ensure long product service life, minimized maintenance, and reduced product liability for those who design, develop, and market them.

The ANSI/SCTE 77-2010 performance specification includes a three-position structural test simulating wheels rolling over an enclosure where loads are imparted laterally and vertically onto the side wall of the enclosure and vertically onto its cover. The related structural integrity tests comprise:

(1). Position one—a lateral side wall test—a test of the area that must withstand soil forces as vehicles approach.

(2). Position two—a vertical side wall test—a test of load applied directly downward onto the vertical side wall.

(3). Position three—a cover test—a test showing how an enclosure responds to a load applied directly to the center of the cover.

The present invention provides an enhanced strength grade level utilities enclosure that can be made from lighter weight polymeric materials. In one embodiment, the enclosure's design provides enhanced structural loading capacity in excess of ANSI Tier 15 vertical side wall load and center cover vertical load requirements.

The ANSI Tier 15 test standards are one example of various industry test standards for grade level enclosures for which the present invention provides enhanced load capacities. Structural improvements, in particular, are demonstrated for enclosures' vertical side wall load capacities; and these improvements would result for different types of enclosures each having their own separate vertical side wall load capacity requirements.

A prior enhanced strength grade level utility enclosure as shown in Applicant's U.S. Pat. No. 9,287,693 B2, the contents of which are incorporated herein by reference, includes parallel vertical wall structures made of a molded polymeric material. The vertical wall structure has an upright inner wall extending from the upper edge to the bottom of the vertical wall structure. The inner wall faces the interior of the enclosure. One or more narrow, vertically extending slotted regions are recessed in the inside face of the inner wall. Upright rigid support bars, adapted for use as cable racks, are positioned in separate slotted regions formed on the inside face of the wall structure. The support bars provide a substantially continuous means of rigid vertical load support extending from the upper edge down to the bottom edge of the enclosure's vertical wall structure. The recessed support bars in combination with the vertical wall structure provide enhanced wall load strength sufficient for exceeding vertical side wall load test standards, among other test standards, for grade level enclosures. A disadvantage of this design is the use of fasteners to rigidly attach the bars to the vertical walls. Mechanical fasteners require additional inventory and time to assemble and the need for the use of tools during assembly. In addition, since the walls are vertical and parallel to one another the enclosures cannot be stacked for shipping. Consequently, a need exists for an improved enhanced strength grade level utilities enclosure that addresses the drawbacks of existing enclosures and can be utilized for tapered wall enclosures.

SUMMARY

Briefly, one embodiment of this invention comprises an enhanced strength grade level utility enclosure which includes tapered wall structures made of a molded polymeric material. The tapered wall structures have an inner wall extending from the upper edge to the bottom of the enclosure. The inner wall faces the interior of the enclosure. A rim extends inwardly around the inner wall at a top opening of the enclosure and has one or more recessed bar pockets positioned on a bottom face of the rim. One or more bracket pockets are formed on the inside face of the inner wall around the bottom opening of the enclosure. Upright rigid support bars, adapted for use as cable racks, are positioned on the inside face of the wall structure by positioning a top of the bar in the bar pocket and a bottom of the bar in a bracket that is positioned in the bracket pockets. The support bars provide a substantially continuous means of rigid vertical load support extending from the upper edge down to the bottom edge of the enclosure's tapered wall structure. The support bars in combination with the tapered wall structure and attachment points provide enhanced wall load strength sufficient for exceeding side wall load test standards, among other test standards, for grade level enclosures having tapered walls. In addition, the bars can be installed easily without the use of tools or mechanical fasteners.

These and other aspects of the invention will be more fully understood by referring to the following detailed description and the accompanying drawings.

DETAILED DESCRIPTION OF THE DRAWINGS

Figure 1:
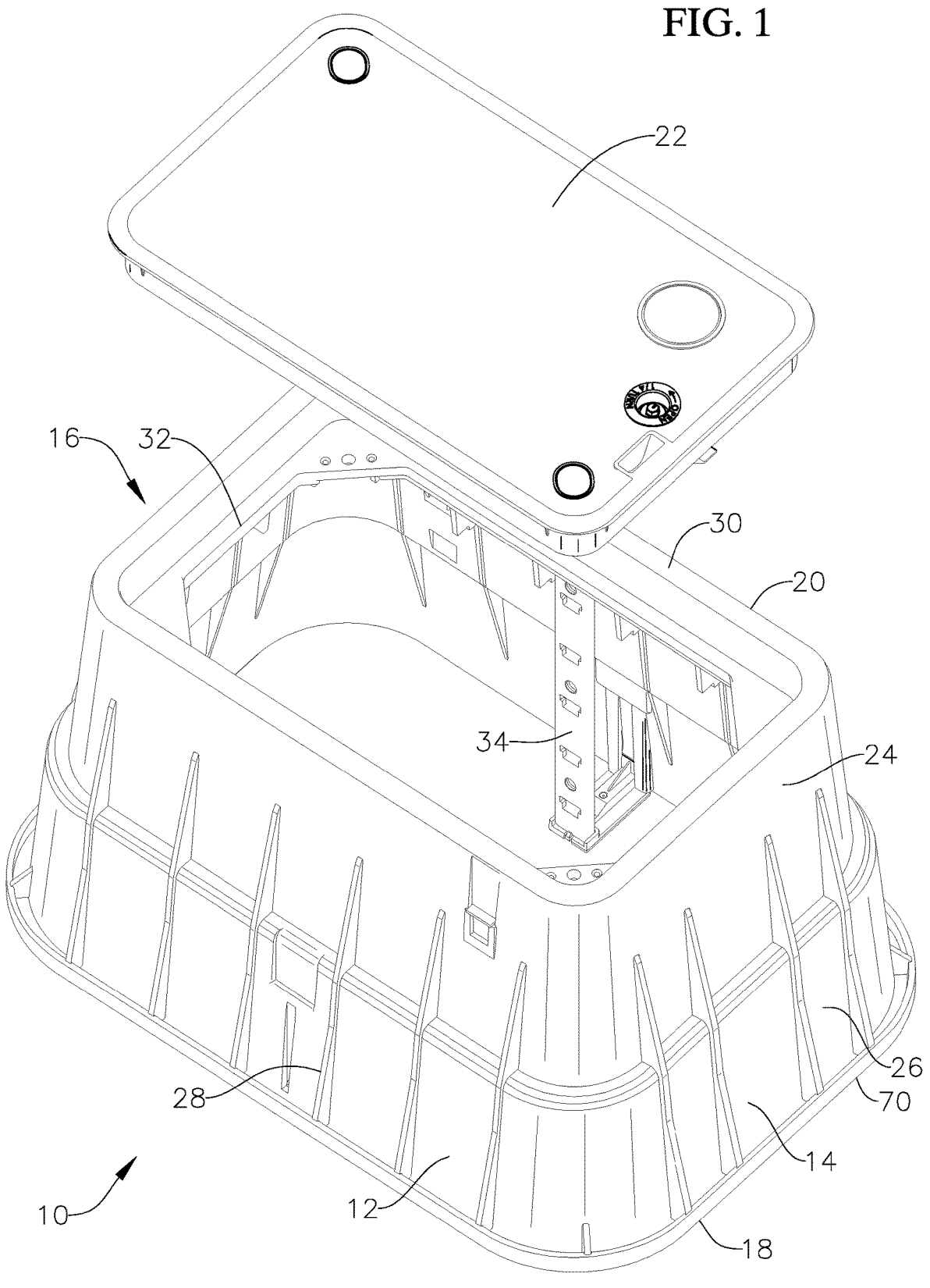
FIG. 1 is an exploded perspective view of an enhanced strength grade level enclosure of the present invention.

FIGS. 1-5 illustrate an embodiment of a grade level underground utilities enclosure 10 according to principles of this invention. The enclosure includes a pair of long side walls 12 and a pair of shorter end walls 14 forming a generally rectangular structure having a hollow interior 16. Although the enclosure has been shown as rectangular, other geometrical shapes are possible, such as square or circular. The grade level enclosure has an open bottom 18. An open top 20 of the enclosure receives a flat top cover plate or lid 22. Walls 12 and 14 are tapered from the top to the bottom such that the open top is smaller than the open bottom allowing for stacking of multiple enclosures for shipment. The walls are tapered by having wall sections 24 and 26 which are successively smaller in circumference thereby being tapered narrower in an upward direction to enclose the hollow interior region within the enclosure. The enclosure is made, for example, of a hard molded plastic such as high-density polyethylene or other composite material. The enclosure also has molded integrally formed vertical flanges 28 facing outwardly along each side wall. This construction of the enclosure provides good compressive strength to resist vertical loads on the side walls of the enclosure. Other configurations of flanges for additional strength can be incorporated.

The enclosure as shown in FIG. 1 illustrates the top cover plate or lid 22 opened to reveal the interior of the enclosure. This embodiment also illustrates use of a ring 30 positioned on a top ledge or rim 32 of the enclosure's side wall structure. In this embodiment the lid 22 rests within the ring and on the rim during use. A cable rack 34 is positioned along an inside surface of side walls 12, 14 as described in more detail herein.

Figure 2:
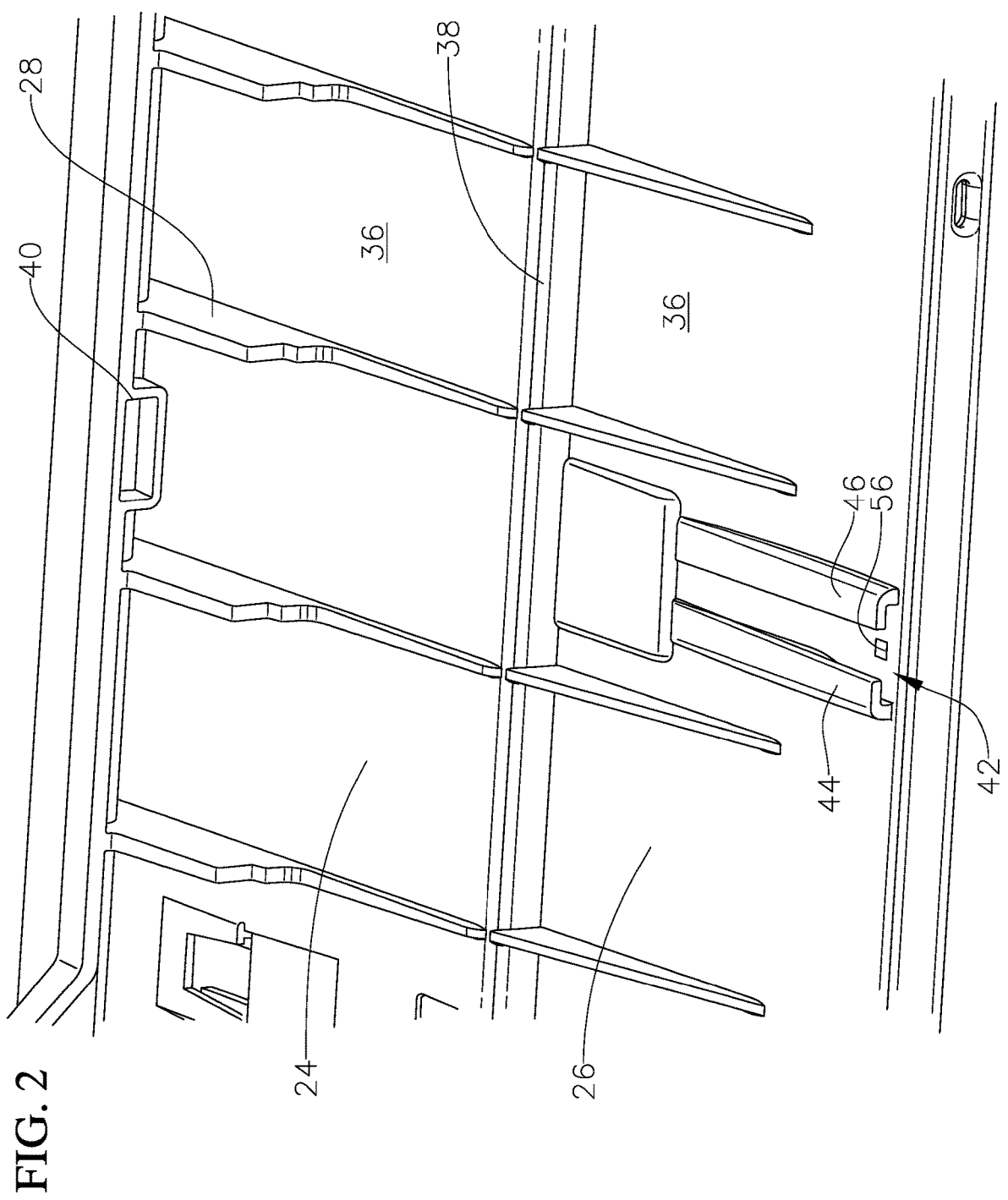
FIG. 2 is a partial detail view of an inner wall of the enclosure of FIG. 1.

FIG. 2 illustrates a more detailed construction of the interior wall configuration. The tapered vertical wall structure of the enclosure is formed by having the integrally molded wall sections 24, 26 with the vertical flanges 28. Each wall section 24, 26 includes a vertical inner wall flat inside surface 36 that extends continuously around and faces toward the open interior of the enclosure. Wall section 24 transitions into wall section 26 by a horizontal shoulder 38 located between them. Although two wall sections 24 and 26 are illustrated, an enclosure could have three or more sections comprising the tapered wall. A cable rack pocket 40 is formed on a bottom surface of the rim 32 for each cable rack to be installed within the enclosure and is sized for receipt on a top end of a rack 34 as shown in FIG. 4. A corresponding bracket pocket 42 is vertically aligned with pocket 40 and is formed along the lower ledge of the enclosure by curved molded flanges 44, 46 extending away from surface 36. Flanges 44, 46 are spaced from one another and curve towards each other to form an opening for receipt of a bracket 48 shown in FIG. 3. Flanges 44, 46 taper towards surface 36 in a vertically upward direction thereby forming a wedge-shaped opening for receipt of the bracket.

Figure 3:
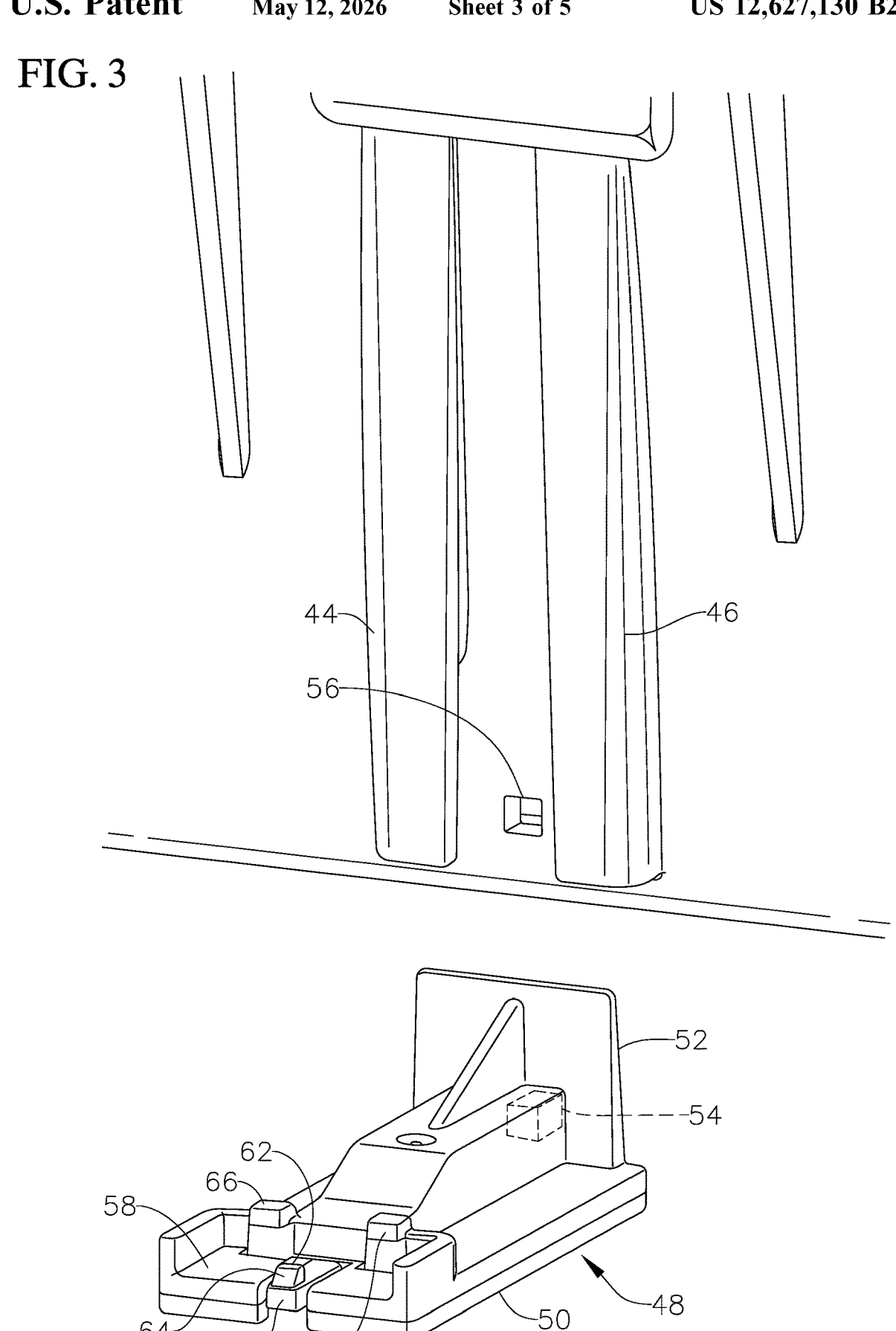
FIG. 3 is a partial detail view of the bracket and bracket pocket.
Figure 4:
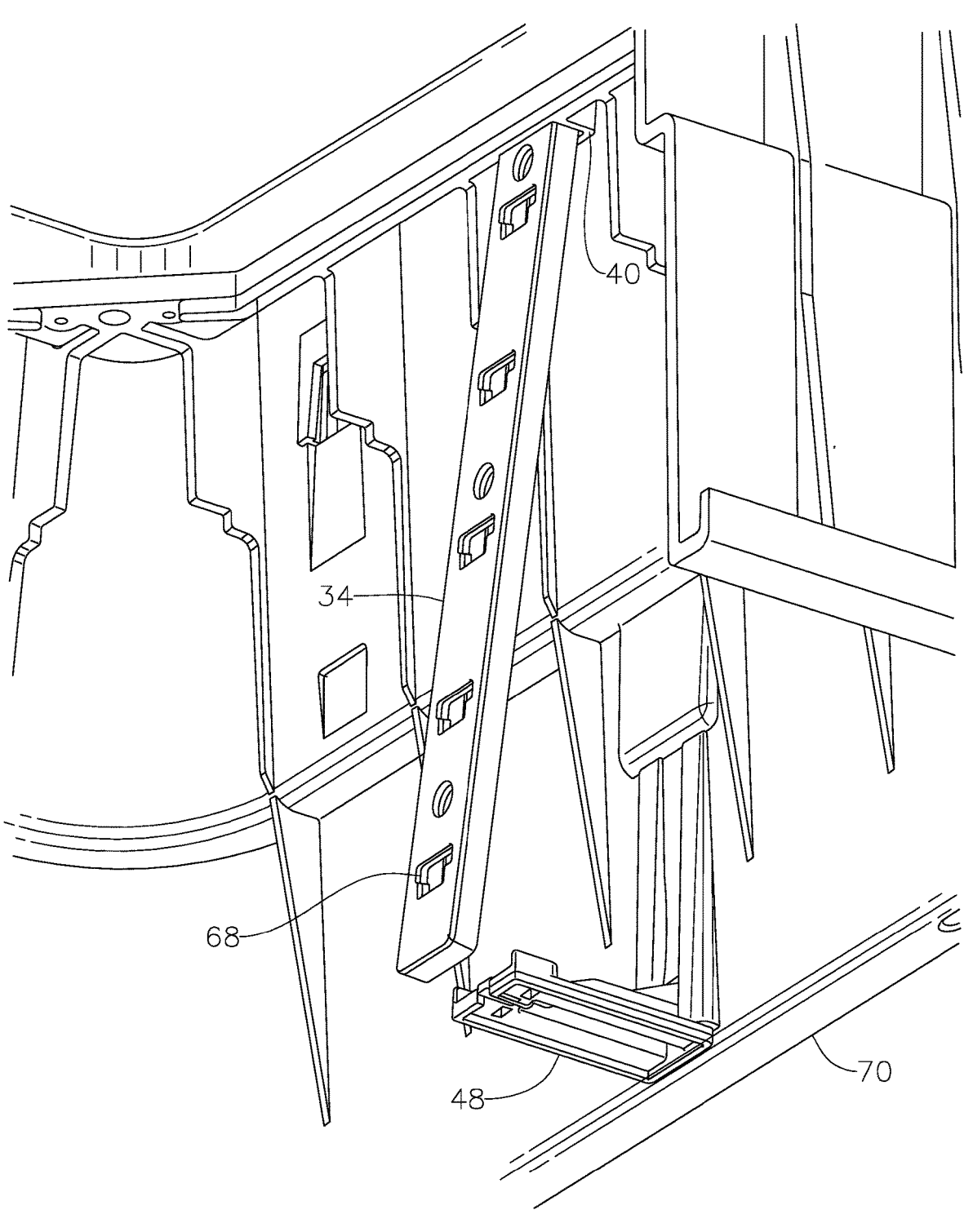
FIG. 4 is a detail view of the of FIG. 2 illustrating installation of a support bar and bracket.
Figure 5:
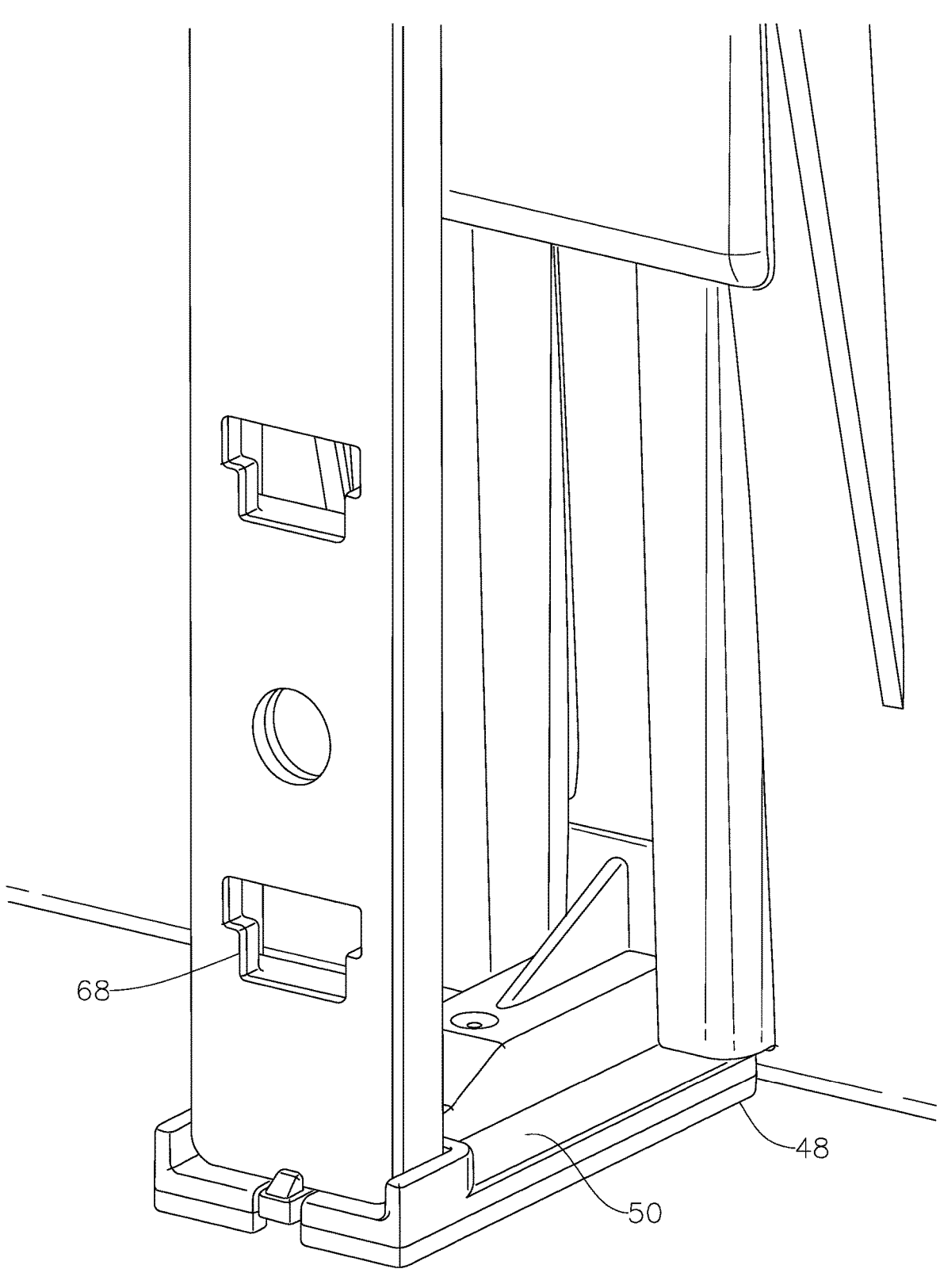
FIG. 5 is a detail view of FIG. 4 illustrating the support bar in the bracket.

Referring to FIG. 3, the bracket 48 includes a base 50 and a vertical wedge-shaped wall 52 extending upwardly from one end of the base. When the bracket is installed into pocket 42, wall 52 is inserted into the wedge-shaped opening between flanges 44 and 46. A locating pin 54 extends outwardly from wall 52 and is positioned in opening 56 in wall section 26 between flanges 44, 46 to position the bracket on wall section 26 within the bracket pocket 42. The bracket has a rack pocket 58 located at an end of the base opposite from wall 52. Pocket 58 is sized for receipt of an opposite end of the rack as shown in FIGS. 4 and 5. The pocket 58 has a flexible clip 60 having a detent 62 with an angled leading surface 64 such that when the rack is inserted into the pocket, the rack pushes against the angled surface 64 flexing the detent downwardly until the rack moves past the angled surface and the clip snaps back upwardly and the detent captures the end of the rack within the pocket 58. To remove the rack, the clip would be manually pushed downwardly and the rack end pulled out of the pocket. When installed in the bracket pocket 58, the rack end is captured between detent 62 and stops 66 on the opposite side of the pocket.

As shown best in FIG. 4, the rack 34 is first installed in the upper pocket 40 and then the opposite end of the rack is snapped into the bracket 48. Because the walls 12, 14 of the enclosure are tapered, the length of the base 50 is sized such that the rack will be substantially vertical within the enclosure for its intended use as shown in FIG. 5. In essence, the length of the base will compensate for the degree of taper for a specific enclosure. The cable racks 34 are adapted for supporting various types of internal equipment used in the enclosure, via a stepped series of vertically spaced apart connectors 68. Each cable rack is generally U-shaped, channel or box-shaped in cross sectional configuration. The cable racks are preferably made from galvanized steel or stainless steel, although they can be made from hard plastic or fiberglass. The racks and brackets can be installed in the enclosure without the use of mechanical fasteners or hand tools.

Although FIG. 1 illustrates one cable rack 34 positioned on one longitudinal side wall of the enclosure, more cable racks could be positioned on each side of the enclosure. In use, the cable rack provides a substantially continuous means of rigid vertical support extending from the top to the bottom of the enclosure's outer wall. The wall of the enclosure has an annular bottom edge 70 on which the enclosure is supported when the enclosure rests on the ground.

Although the present invention has been described and illustrated herein with respect to one embodiment, however it is to be understood that changes and modifications can be made therein which are within the full intended scope of the invention as hereinafter claimed.

What is claimed is:

1. A grade level utility enclosure for underground utilities connections, comprising:

a tapered vertical wall structure extending continuously around an open interior region within the tapered vertical wall structure, the wall structure made of a molded polymeric material;

the tapered vertical wall structure having a rim extending around a top opening to the interior of the enclosure and a bottom edge on which the enclosure is supported;

a removable lid adapted for mounting on the rim over the top opening in the grade level enclosure;

the tapered vertical wall structure including a first wall panel section and a second wall panel section, the first wall panel section panel is smaller in circumference than the second wall panel section; and an upright rigid support bar adapted for use as a cable rack having a first end positioned in a first pocket located in the rim and a second end positioned in a second pocket located in a bracket positioned on an inside surface of the second wall panel section.

2. The enclosure of claim 1, further comprising a bracket pocket extending from the inside surface of the second wall panel section.

3. The enclosure of claim 2, wherein the bracket pocket is formed by curve flanges.

4. The enclosure of claim 2, wherein the bracket has a wedge-shaped vertical wall for insertion into the bracket pocket.

5. The enclosure of claim 4, wherein the bracket includes a base section extending substantially perpendicular from the wedge-shaped vertical wall.

6. The enclosure of claim 5, wherein the second pocket is positioned on an end of the base section opposite wedge-shaped vertical wall.

7. The enclosure of claim 1, wherein the second pocket has a flexible clip and a detent on the flexible clip that flexes during positioning of the second end of the support bar into the second pocket.

8. The enclosure of claim 1, wherein the bracket has a locating pin for receipt in an opening in the bracket pocket.

9. The enclosure of claim 1, wherein the enclosure is substantially rectangular.

10. The enclosure of claim 5, wherein the base section is configured to support the support bar in a substantially vertical orientation.

11. A grade level utility enclosure for underground utilities connections, comprising:

a tapered wall structure extending continuously around an open interior region within the tapered wall structure, the wall structure made of a molded polymeric material;

the tapered wall structure having a rim extending around a top opening to the interior of the enclosure and a bottom edge on which the enclosure is supported;

a removable lid adapted for mounting on the rim over the top opening in the grade level enclosure;

the tapered wall structure including a first wall panel section having a vertical surface facing the open interior region and a second wall panel section having a vertical surface facing the open interior region, the first wall panel section panel is smaller in circumference than the second wall panel section and the first wall panel section is connected to the second wall panel section by a horizontal shoulder section; and an upright rigid support bar adapted for use as a cable rack having a first end positioned in a first pocket located in the rim and a second end positioned in a second pocket located in a bracket positioned on an inside surface of the second wall panel section.

12. The enclosure of claim 11, further comprising a bracket pocket extending from the inside surface of the second wall panel section.

13. The enclosure of claim 12, wherein the bracket pocket is formed by curve flanges.

14. The enclosure of claim 12, wherein the bracket has a wedge-shaped vertical wall for insertion into the bracket pocket.

15. The enclosure of claim 14, wherein the bracket includes a base section extending substantially perpendicular from the wedge-shaped vertical wall.

16. The enclosure of claim 15, wherein the second pocket is positioned on an end of the base section opposite wedge-shaped vertical wall.

17. The enclosure of claim 11, wherein the second pocket has a flexible clip and a detent on the flexible clip that flexes during positioning of the second end of the support bar into the second pocket.

18. The enclosure of claim 11, wherein the bracket has a locating pin for receipt in an opening in the bracket pocket.

19. The enclosure of claim 11, wherein the enclosure is substantially rectangular.

20. The enclosure of claim 15, wherein the base section is configured to support the support bar in a substantially vertical orientation.

* * * * *